(12) United States Patent
Förster et al.

(10) Patent No.: US 11,816,825 B2
(45) Date of Patent: Nov. 14, 2023

(54) METHOD FOR EVALUATING THE INSTALLATION POSITION OF A MEASURING DEVICE IN A SYSTEM, AUGMENTED REALITY DEVICE AND METHOD FOR INSTALLING A MEASURING DEVICE

(71) Applicant: KROHNE Messtechnik GmbH, Duisburg (DE)

(72) Inventors: Jan Förster, Essen (DE); Martin Krawczyk-Becker, Herne (DE)

(*) Notice: Subject to any disclaimer, the term of this patent is extended or adjusted under 35 U.S.C. 154(b) by 165 days.

(21) Appl. No.: 17/221,245

(22) Filed: Apr. 2, 2021

(65) Prior Publication Data
US 2021/0312606 A1 Oct. 7, 2021

(30) Foreign Application Priority Data
Apr. 3, 2020 (DE) .................... 10 2020 109 357.8

(51) Int. Cl.
*G06T 7/00* (2017.01)
*G06T 7/70* (2017.01)
(Continued)

(52) U.S. Cl.
CPC .............. *G06T 7/0004* (2013.01); *G06T 7/60* (2013.01); *G06T 7/70* (2017.01); *G06T 11/00* (2013.01); *G06T 19/006* (2013.01); *G06V 20/20* (2022.01)

(58) Field of Classification Search
CPC ........... G06T 7/0004; G06T 7/60; G06T 7/70; G06T 11/00; G06T 19/006; G06V 20/20; G06F 3/011
See application file for complete search history.

(56) References Cited

U.S. PATENT DOCUMENTS 10,878,240 B2 * 12/2020 Laycock ................ G06V 20/20
10,963,596 B1 * 3/2021 Wood ..................... G06T 19/20
(Continued)

FOREIGN PATENT DOCUMENTS

| DE | 102017010190 A1 | 5/2019 |
| DE | 102018104056 B3 | 8/2019 |
| DE | 102018214210 A1 | 2/2020 |

OTHER PUBLICATIONS

McDonald et al., Virtual Flow Meter to Estimate the Water Flow Rates in Chillers, ASHRAE Transactions, vol. 120, pp. 200-208 (Year: 2014).*

(Continued)

*Primary Examiner* — Motilewa Good-Johnson
(74) *Attorney, Agent, or Firm* — Patrick D. Duplessis

(57) ABSTRACT

A method is disclosed for evaluating the installation position of a measuring device in a system using an augmented reality device, wherein the augmented reality device has at least one capturing unit for capturing the system, at least one computing unit and at least one display unit, the method comprising the following steps: at least partially capturing the system using the at least one capturing unit; visually representing the system on the display unit on the basis of the at least partial capturing of the system; assigning at least one measuring device installed in the system in an installation position and/or placing at least one virtual measuring device in an installation position in the visual representation of the system; evaluating the installation position of the at least one recognized and/or virtual measuring device using the computing unit; and representing the evaluation on the display unit.

12 Claims, 3 Drawing Sheets

(51) Int. Cl.
  *G06T 7/60*   (2017.01)
  *G06T 11/00*  (2006.01)
  *G06V 20/20*  (2022.01)
  *G06T 19/00*  (2011.01)

(56) References Cited

U.S. PATENT DOCUMENTS

| | | | |
|---|---|---|---|
| 11,127,220 B2 | 9/2021 | Schmelig et al. | |
| 11,455,300 B2* | 9/2022 | Mehrotra | G06Q 50/04 |
| 2011/0115816 A1* | 5/2011 | Brackney | H05B 47/10 |
| | | | 700/295 |
| 2012/0185239 A1 | 7/2012 | Goud et al. | |
| 2013/0038633 A1* | 2/2013 | Maggiore | B01L 99/00 |
| | | | 29/407.01 |
| 2013/0144482 A1 | 6/2013 | Tuukkanen | |
| 2013/0321245 A1* | 12/2013 | Harper | G05B 19/409 |
| | | | 345/7 |
| 2016/0247324 A1 | 8/2016 | Mullins et al. | |
| 2017/0255450 A1 | 9/2017 | Mullins et al. | |
| 2018/0129276 A1* | 5/2018 | Nguyen | G06F 3/016 |
| 2019/0020721 A1* | 1/2019 | Chun | G08B 25/08 |
| 2019/0035152 A1 | 1/2019 | Kazansky | |
| 2021/0185239 A1* | 6/2021 | Keller | H04N 5/265 |
| 2021/0201273 A1* | 7/2021 | Lakshmipathy | G06F 30/12 |
| 2021/0312606 A1* | 10/2021 | Förster | G06T 7/0004 |
| 2023/0064402 A1* | 3/2023 | Skoda | G16H 20/13 |

OTHER PUBLICATIONS

Ong, S.K., et al; "Augmented Reality Aided Assembly Design and Planning"; 2007 CIRP Annals, Manufacturing Technology, vol. 56, Issue 1; 4 Pages.

Westerfield, Giles, et al; "Intelligent Augmented Reality Training for Motherboard Assembly"; International Artificial Intelligence in Education Society; Nov. 4, 2014; 16 Pages.

* cited by examiner

METHOD FOR EVALUATING THE INSTALLATION POSITION OF A MEASURING DEVICE IN A SYSTEM, AUGMENTED REALITY DEVICE AND METHOD FOR INSTALLING A MEASURING DEVICE

TECHNICAL FIELD

The invention is based on a method for evaluating the installation position of a measuring device, in particular a flowmeter or a level measuring device, in a system with an augmented reality device, wherein the augmented reality device has at least one capturing device for capturing the system, at least one computing unit and at least one display unit.

Furthermore, the invention relates to an augmented reality device with at least one capturing device for capturing the system, at least one computing unit and at least one display unit.

Furthermore, the invention relates to a method for installing a measuring device in a system.

BACKGROUND

When installing measuring devices in already existing systems or also when replacing already installed measuring devices, conditions regarding the position and also the type of the measuring device must be observed for the correct functioning of the measuring device. For example, parameters to consider when installing flowmeters are the recommended inlet and outlet distances, positioning in relation to downpipes or angles, and positioning in relation to other components of the system such as valves or pumps. Not all factors can always be fully met at the same time, especially in the case considered here, where a measuring device is to be installed in an existing system. For example, it may not be possible to comply with the manufacturer's recommended inlet and outlet distances with the existing piping. Thus, an "optimal" compromise is required under the given boundary conditions.

A method for optimized arrangement and alignment of a field device with a module that emits radiation not visible to the human eye using an augmented reality device is known from the document DE 10 2018 104 056 B3. The optimization of the alignment is carried out by superimposing the radiation pattern with the reality component, wherein objects arranged within the radiation pattern can be determined. A time-consuming testing of the transmission and reception characteristics of the field device can thus be avoided.

In addition, the use of augmented reality devices in various fields of application is known from US 2019/0035152 A1, US 2013/0144482 A1, US 2017/0255450 A1 and US 2016/0247324.

The object of the present invention is thus to provide an improved method for evaluating the installation position of a measuring device, based on the described prior art. Furthermore, it is the object of the invention to provide a corresponding augmented reality device and a method for installing a measuring device in a system.

According to a first teaching of the invention, the aforementioned object is achieved by a method described in the introduction in that the method comprises the following steps:

at least partial capturing of the system by the at least one capturing device, visual representation of the system on the display unit on the basis of the partial capture of the system, assignment of at least one measuring device installed in the system in an installation position and/or placement of at least one virtual measuring device in an installation position in the visual representation of the system, evaluation of the installation position of the at least one detected and/or virtual measuring device by the computing unit, representation of the evaluation on the display unit.

According to the invention, it has been recognized that the installation position of an already-installed measuring device or of a measuring device to be installed can be virtually checked with regard to the specifications for the installation to ensure correct functioning and can be evaluated accordingly, so that incorrect installation can be detected and/or avoided. Basically, the idea is based on the creation of a virtual 3D and/or 2D model of the real system, wherein, in particular, the measuring device to be evaluated is assigned manually and/or automatically by the computing unit and/or whereby a virtual measuring device can preferably be arranged manually in the model of the system at the desired installation location. The detected measuring device or the measuring device placed in the system is linked to a list of installation criteria, wherein, in order to evaluate the installation position of the measuring device, the computing unit checks whether and to what extent the installation criteria are fulfilled.

The assignment of the measuring device comprises both the recognition of the type of measuring device, i.e., whether it is a flowmeter or a level measuring device, for example, and the recognition of the type of measuring device. In addition, the assignment also includes recognition of whether the device is a compact device or a remote device.

In this context, a compact device is a measuring device that has all components, in particular for controlling the measuring device and for evaluating the measured data. In contrast, a remote device is a measuring device in which at least one component is not arranged directly on the measuring device, which can be operated in particular via a remote control.

According to an advantageous design, the augmented reality device comprises at least one AR headset, smart glasses, at least one smart phone or at least one tablet. Other devices that enable a visualization of a real system and/or a superimposition of such a visualization with a virtual measuring device are also suitable for implementing the method according to the invention.

Particularly preferably, the capturing device for creating the model of the system forwards image data and/or video data and/or thermal image data and/or stereo data and/or depth camera data to the computing unit and/or to the display unit. According to a preferred design, the capturing device comprises at least one camera and/or thermal imaging camera and/or depth camera.

A further design is characterized in that the computing unit recognizes the type and/or the size and/or the length and/or the orientation of individual components of the system based on the data transmitted by the capturing device.

In detail, the components of the system are, in particular, valves, pumps, pipes, pipe connectors, pipe sections, gate valves, culverts, tanks and/or measuring devices.

Alternatively, or additionally, the type and/or size and/or length and/or orientation of individual components of the system can be entered and/or corrected manually by the user.

If the component is a pipe or a pipe piece or a pipe connector, the size comprises, in particular, the inner and/or the outer pipe diameter.

According to a further design, the computing unit also detects the orientation of the measuring device to be evaluated and/or the components of the system. Particularly preferably, the computing unit determines the flow direction of a medium through the system in particular based on the orientation of the measuring device and/or the components of the system and/or taking into account the labeling of the measuring device and/or the labeling of at least one component of the system.

Alternatively, the direction of flow can also be indicated by the user, for example by swiping across the display unit.

According to a particularly preferred embodiment, the measuring device whose installation position is to be assessed is a level measuring device or a flowmeter. When installing corresponding measuring devices in existing systems, various specifications must be taken into account to ensure correct operation, in particular with regard to the position of the installed measuring device. By means of the method according to the invention, it can be advantageously checked and displayed whether the specifications are fulfilled at the intended installation location of the measuring device. Particularly preferably, the method according to the invention can be used to determine the installation position of a plurality of measuring devices of different types or of the same measuring devices.

According to a particularly preferred design, installation criteria are used to evaluate the installation position of the at least one detected and/or virtual measuring device, wherein the installation criteria takes into account the relative position of the measuring device to at least one further component of the system and/or the flow direction of a medium and/or the type of measuring device and/or the installation environment of the measuring device.

If the measuring device to be installed is a compact device, the installation criteria also include checking whether sufficient space is available for the installation of such a measuring device.

According to one design of the method, the installation criteria also include the orientation of the measuring device. In particular, if the detected or virtually positioned flowmeter is a compact device, the computing unit checks the positioning of the converter housing.

If the converter housing is positioned to the side of the flowmeter, the orientation of the flowmeter is evaluated as unsuitable. In suitable orientations, the converter housing is arranged above or below the measuring tube of the flowmeter.

In addition, when evaluating the installation position of a flowmeter, positions are evaluated as unsuitable in which, for example, the flowmeter is installed on the suction side of a pump and/or in which the flowmeter is installed downstream of a valve or gate valve and/or in which the flowmeter is installed in a downpipe.

To determine the evaluation of the installation position, it is preferably also taken into account whether the flowmeter is installed in a horizontal pipe and/or whether a culvert is provided upstream of a free outlet to ensure a fully filled pipe and/or whether the recommended length of the inlet upstream of the flowmeter is complied with and/or whether the recommended length of the outlet downstream of the flowmeter is complied with and/or whether the recommended length of the outlet downstream of the flowmeter is complied with and/or whether the diameter of the measuring tube of the flowmeter to be installed is substantially the same as the diameter of the piping of the system and/or whether there is a taper in front of the measuring device and/or whether the height of the display of the measured values is suitable for reading, preferably whether the display is located at a height between 0.5 m and 1.70 m, particularly preferably at a height of about 1.1 m.

It is particularly preferred that the evaluation also takes into account whether the system exhibits vibrations at the installation location. If the expected vibrations are above a limit value, a remote device is suggested by the computing unit.

Furthermore, to determine the evaluation of the installation position, it is preferably also taken into account whether the recommended distance between a T-piece and the inlet of the flowmeter is maintained.

If the flowmeter has a V-shaped or U-shaped bent measuring tube, it is preferably also checked whether the curvature of the flowmeter is oriented upward when measuring gases or whether the curvature of the flowmeter is oriented downward when measuring liquids. This takes into consideration that condensate or gases can collect in the curvature.

Particularly in hygienic applications where the pipes must be completely drained, it is preferable to check whether the bend in V-shaped flowmeters is positioned such that the flowmeters can always run empty. This is fulfilled if the bend is oriented to the side.

In addition to the evaluation of the installation position or orientation of a flowmeter, the computing unit can also preferably display recommendations for further optimization of the captured system and thus for optimization of the boundary conditions of the installation position of the measuring device. Hereby, the computing unit checks further optimization criteria.

Particularly preferably, the installation of an automatic air release valve at the upper end of a downpipe is suggested, if this downpipe overcomes a height difference of more than 5 m, in order to remove gases escaping from the liquid medium due to cavitation from the pipe so as not to distort the flow profile.

Preferably, an additional space requirement for thermal insulation is also taken into account, with the augmented reality device storing which components of the measuring device are not to be covered with thermal insulation.

If the detected flowmeter is a Coriolis mass flowmeter, stable suspension of the piping system is recommended to prevent the weight of the measuring device from bending the pipes of the system.

It is also particularly preferable to protect the flowmeters from strong sunlight.

If the measuring device to be evaluated is a level measuring device, criteria relevant to the installation of the level measuring device must be checked accordingly.

The evaluation of the installation position includes, in particular, a representation as a suitable installation position and a representation as an unsuitable installation position. The representation of the evaluation can include, for example, a check mark for a suitable installation position and an "x" for an unsuitable installation position.

In addition to an evaluation as suitable or unsuitable, it is also possible to determine gradations between the previously mentioned evaluations and preferably output them via the display unit. In this way, different, basically suitable installation positions can be compared with each other.

According to one design, the evaluation of the installation position is carried out on a scale, with the representation of the evaluation being indicated by a color coding and/or by a numerical value and/or by a further scalable parameter.

Particularly preferably, the evaluation comprises an overall evaluation, wherein the overall evaluation results from the combination of several individual evaluations, wherein each individual evaluation concerns the evaluation of an individual installation criterion.

Particularly preferably, the individual installation criteria are weighted differently when determining the overall evaluation. The weighting may be fixed for all evaluations or may be fixed for individual evaluations, in particular by the user.

According to an advantageous design, the overall evaluation of the installation position of a flowmeter comprises the detection and evaluation of at least one of the following criteria, wherein the evaluation of whether the predetermined criteria are met is quantified by an evaluation parameter $x_i$ in each case:

- Is the measuring device positioned downstream of a valve and/or upstream of a pump? If yes, $x_1=0$, otherwise $x_1=1$.
- Is the measuring device installed in a downpipe? If yes, $x_2=0$, otherwise $x_2=1$.
- Is the measuring tube diameter larger than the piping? If yes, $x_3=0$, otherwise $x_3=1$.
- Determination of the evaluation parameter of the recommended inlet distance $x_4=(actual\_inlet/recommended\_inlet)$, where $x_4$ is limited to a maximum of 1.
- Determination of the evaluation parameter of an inlet distance optimized by a taper $x_5$. If the evaluation parameter $x_4=1$, then $x_5=1$, otherwise $x_5=x_4*x_4$.
- Determination of the evaluation parameter of the recommended outlet distance $x_6=(actual\_outlet/recommended\_outlet)$, where $x_6$ is limited to a maximum of 1.
- Is the display of the measuring device placed in a clearly visible position? If the display is hidden, then $x_7=0$. If the display is visible, then $x_7=exp(-1*(1.1\ m-installation\_height\_in\_m)^2)$.
- If the installation angle of the gauge relative to the horizontal axis is greater than the arctangent of the ratio of the inside diameter of the gauge to the actual inlet distance, then $x_8=1$. If the installation angle of the gauge relative to the horizontal axis is less than the arctangent of the ratio of the inside diameter of the gauge to the actual_inlet distance and there is a culvert or riser behind the gauge, then $x_8=1$. Otherwise, $x_8=0$.
- Is the gauge located on a partially filled pipe? If yes, $x_9=0$, otherwise $x_9=1$.
- Is there sufficient space for a compact instrument? If yes, $x_{10}=1$, otherwise $x_{10}=0$.

Each of the previously described criteria corresponds to one of the above individual criteria for determining an overall rating.

The overall evaluation of the installation position of a measuring device results from the overall consideration of the evaluation parameters $x_i$, where i=1 ... 10. If one of the evaluation parameters $x_i=0$, according to one design, the overall evaluation is also 0 and the installation position is evaluated as poor or not suitable.

Preferably, the overall evaluation results from an averaging of the individual evaluation parameters $x_i$. The highest average rating is evaluated as the best rated installation position.

Alternatively, the sum of the individual evaluation parameters $x_i$ can be used to determine the overall evaluation. It is also conceivable that the individual evaluation parameters $x_i$ are linked by another calculation operation.

By determining the overall evaluation, which can assume different values for different positions within the system, individual positions can be compared with regard to a possible installation position of a measuring device.

According to one embodiment, an optimal installation position is defined in that, on the one hand, the overall evaluation is the best evaluated installation position and, on the other hand, the value of the overall evaluation is above a threshold value, in particular greater than 0.5 or greater than 1.

A further design of the method is characterized in that if the overall evaluation of an installation situation is too poor, in particular too low, for example if the overall evaluation is below the defined threshold value, the computing unit determines an installation position with a better, in particular higher, overall evaluation, preferably taking into account virtual structural changes to the system, and displays it via the display unit.

For this, the computing unit preferably first determines the evaluation parameter $x_i$, whose value $x_i=0$ or whose value $x_i$ was below the defined threshold, and virtually modifies the system to meet the corresponding specification and increase the value of the corresponding evaluation parameter $x_i$. For example, in the case of a suboptimal inlet section, the installation of a taper can increase the evaluation parameter $x_4$. Subsequently, based on the modified system, the overall evaluation of the installation position is determined again.

According to another preferred design, each structural modification of the system is linked to a cost factor for the respective structural modification.

Particularly preferably, the installation position with the best evaluation and the lowest modification costs is displayed to the user as an optimization suggestion. The weighting of the costs and the optimization of the installation position can be changed for each individual case and defined by the user.

Particularly preferably, the computing unit alternatively or additionally determines an optimal installation position of the measuring device in the system, taking into account the, in particular weighted, installation criteria, wherein the optimal installation position is preferably displayed in the visualization of the system. This has the advantage that the best possible installation position can be determined taking into account the conditions of the system, even if not all the specifications for the installation of the measuring instrument can be met.

According to a particularly preferred design, the evaluation, in particular the overall evaluation, of all possible installation positions is compared to determine the optimal installation position. According to a preferred design, the installation position with the best, in particular the highest, evaluation is output as the optimal installation position, preferably via the display unit. According to this design, different installation positions can be compared objectively, i.e., on the basis of their overall evaluations, so that an optimal installation position for the existing system can be determined.

A next design of the method is characterized in that at least one component of the system is changed by the user and/or by the computing unit with regard to its type and/or its position and/or its dimensions and/or its orientation in the visualization of the system, i.e. virtually, and/or that at least one component is added to the visualization of the system and/or is removed from the system, so that, as a result, the system is at least partially changed virtually and that the installation position of the measuring device in the modified system is evaluated and/or that the optimal installation position of the at least one measuring device in the modified system is determined. In a particularly advantageous manner, according to this design, it can be evaluated which changes must be made to the existing system so that the installation situation for the measuring device can be improved.

Particularly preferably, the computing unit determines the installation criteria that are not or not completely fulfilled by the installation position of the detected or virtual measuring device in the system. These installation criteria that are not or not completely fulfilled are preferably displayed to the user via the display unit. Particularly preferably, an optimization suggestion is also displayed, which comprises a modification of the system.

For example, according to one design, in the case where a flowmeter is installed in a horizontal pipe, it is suggested to provide a slight slope of the pipe. In addition, for example, in the case where there is not enough space for a compact device, the computing unit proposes to install a remote device.

According to a further advantageous design, the augmented reality device comprises a memory unit, wherein data from a plurality of measuring devices and/or from a plurality of further components of the system are stored in the memory unit, wherein the computing unit determines, based on the stored data, in particular the type of measuring device and/or the type and/or the dimensions of at least one further component. Particularly preferably, the stored data comprise, in particular, installation criteria for the installation of a measuring device.

By comparing or retrieving the data stored in the memory unit, on the one hand, an assignment of the detected measuring device and/or the further components of the system can be made particularly simply and reliably. On the other hand, the installation criteria to be tested for the detected measuring device to be tested can also be retrieved directly.

It is also particularly preferred if the at least one measuring device is replaced by an alternative measuring device by the user and/or by the computing unit in the visualization, i.e., the visual representation of the system, and that the installation position of the alternative measuring device in the system is evaluated and/or that the optimal installation position of the alternative measuring device in the system is determined. According to this design, it can be assessed whether a different measuring device than the one initially envisaged is more suitable for the given installation situation.

According to a second teaching of the present invention, the object described at the beginning is achieved by an augmented reality device described at the beginning in that the augmented reality device is designed such that it carries out a method according to one of the designs described above for evaluating the installation position of a measuring device in a system.

According to a third teaching of the present invention, the object described at the beginning is achieved by a method for installing a measuring device in a system in that, in a first step, a method for evaluating the installation position of a measuring device is carried out according to one of the designs described above, and that, in a second step, the measuring device is installed in the system preferably according to the optimal installation position. This embodiment has the advantage that the measuring device can be installed in the system under the best possible conditions, so that the functioning of the measuring device is improved.

Preferably, the system is structurally modified prior to installation of the measuring device according to the optimization proposal proposed in the method for evaluating the installation position.

BRIEF DESCRIPTION OF THE DRAWINGS

In detail, there is now a plurality of possibilities for designing and further developing the methods according to the invention and the augmented reality device according to the invention. In this respect, reference is made to the following description of preferred embodiments in connection with the drawings.

DETAILED DESCRIPTION

Figure 1:
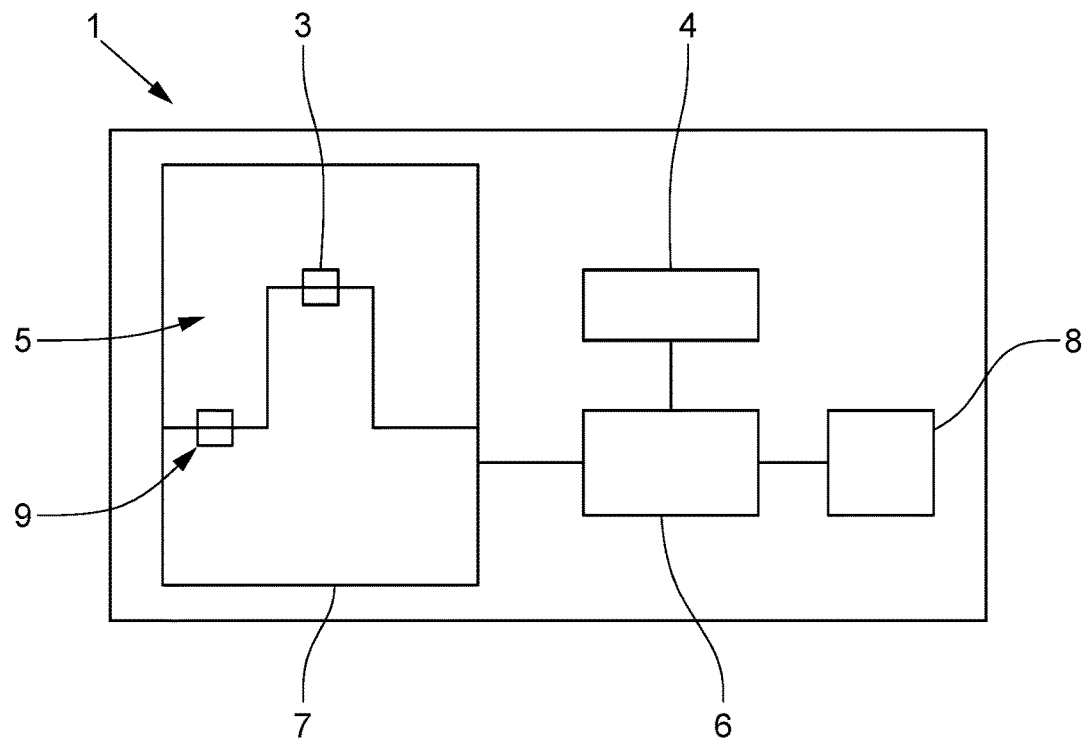
FIG. 1 illustrates an augmented reality device according to the invention.

FIG. 1 shows a first embodiment of an augmented reality device 1 with a capturing device 4 for capturing the real system 5, with a computing unit 6 and with a display unit 7. The capturing device 4 has a camera with which the existing system 5 can be captured. In particular, the capturing device 4 captures a measuring device 3 installed in the system in an installation position. During operation, the capturing device 4 forwards the captured data to the computing unit 6, which in turn processes the data for visualization and forwards it to the display unit 7. The display unit 7 is designed such that it displays the captured system 5 during operation.

The computing unit 6 is also designed such that it recognizes the type and/or size of the individual components of the system 5, in particular the computing unit recognizes the installed measuring device 3. A memory unit 8 is provided for this purpose, in which data from a plurality of measuring devices and from various components of the system 5 are stored. In particular, specifications for the installation of the measuring devices are stored for the individual measuring devices. By comparing the data captured by the capturing device 4 and the data stored in the memory unit 8, the computing unit 6 can determine, in particular, the type of measuring device.

Moreover, the computing unit 6 is designed such that it evaluates the installation position of the captured measuring device 3 on the basis of the stored installation criteria and outputs this evaluation in the form of a color coding of the measuring device 3 via the display unit 7.

In addition to evaluating the installation position of the captured measuring device 3, the computing unit 6 can also suggest an optimal installation position 9 for the measuring device 3 existing in the system 5 based on the stored installation criteria.

Furthermore, the computing unit 6 can also suggest an alternative measuring device 3 or a modification in the existing system 5 based on the data stored in the memory unit 8 to improve the installation situation of the measuring device 3.

Figure 2:
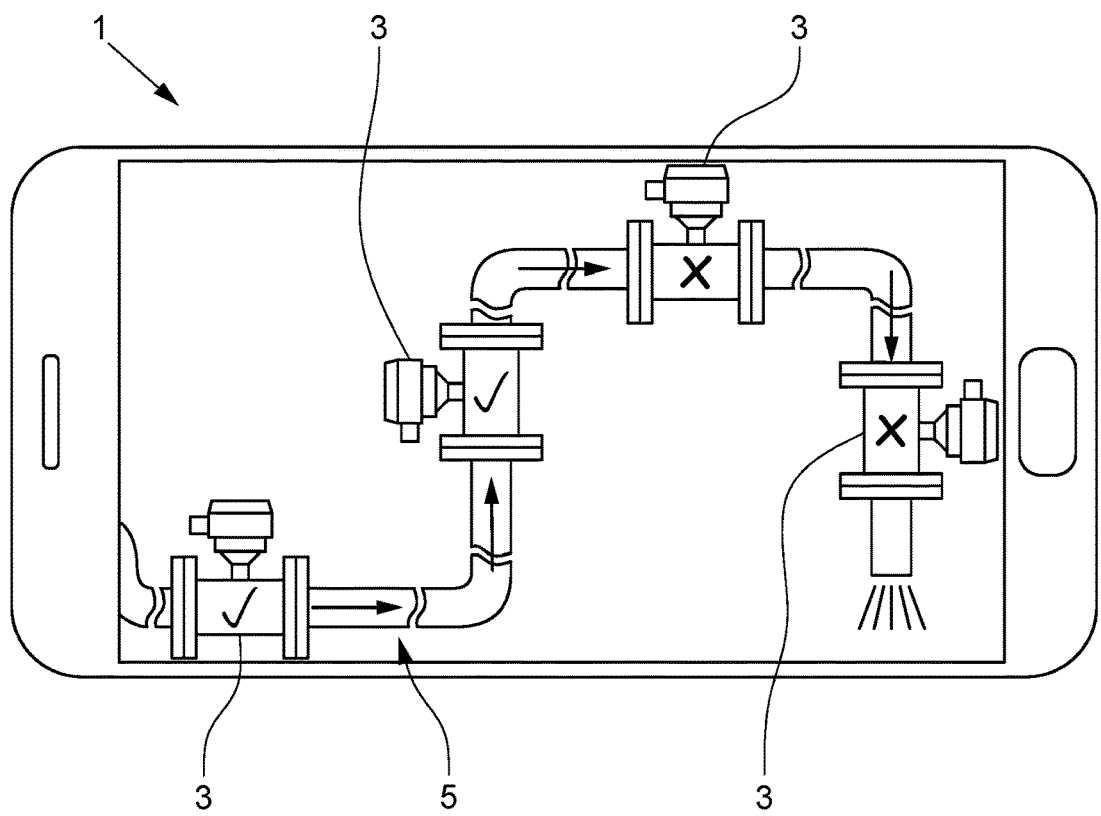
FIG. 2 illustrates another augmented reality device according to the invention.

FIG. 2 shows another embodiment of an augmented reality device 1. In the embodiment shown, the augmented reality device is designed as a smart phone. The display unit 7 is designed as a display. The relevant area of the system 5 is visually represented on the display. The flow direction of the medium flowing through the depicted pipe system is indicated by the arrows. In addition, four measuring devices 3 are shown, which are virtually placed in the system 5 by the user.

The installation position of each individual measuring device 3 is evaluated by the computing unit 6, which is not shown here, wherein the evaluation is represented by a check mark for a suitable installation situation and by an "x" for a poorly-suited installation position.

Figure 3:
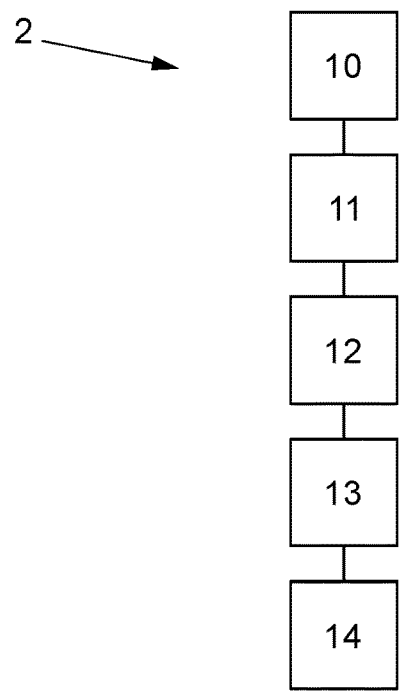
FIG. 3 illustrates a method according to the invention for evaluating the installation position of a measuring device.

FIG. 3 shows a first embodiment of a method 2 for evaluating the installation position of a measuring device 3 with an augmented reality device 1, wherein the augmented reality device 1 is designed according to the embodiment shown in FIG. 1.

The method 2 comprises the following steps:

In a first step, the system 5 is captured by the capturing device 4. In particular, a measuring device 3 and the installation situation surrounding the measuring device 3 are captured.

The captured system 5 is visually displayed 11 on the display unit 7.

An assignment of the captured measuring device 3 is made 12 by the computing unit 6.

Based on the assignment, the installation position of the measuring device is evaluated 13 by the computing unit.

Finally, the evaluation is displayed 14 on the display unit 7.

Figure 4:
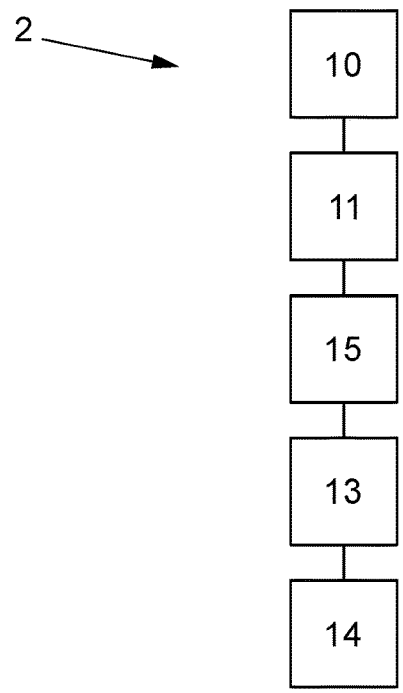
FIG. 4 illustrates another method according to the invention.

FIG. 4 shows a second embodiment of a method 2 for evaluating the installation position of a measuring device 3 using an augmented reality device 1, wherein the augmented reality device 1 is designed according to the embodiment shown in FIG. 1.

Just as in the method 2 shown in FIG. 3, the system 5 is first captured 10 by the capturing device 4. In detail, the area of the system 5 in which a measuring device 3 is to be installed is captured.

This area of the system 5 is visually displayed 11 on the display unit 7.

Now, the user manually places 15 a virtual measuring device in the visualization of the system 5. For this, the user can access the data of different measuring devices 3 stored in the memory unit 8.

Then the computing unit 6 evaluates 13 the installation position of the measuring device 3 based on the installation criteria stored for the measuring device 3.

The evaluation is displayed in the visualization of the system 5 in a next step 14.

Figure 5:
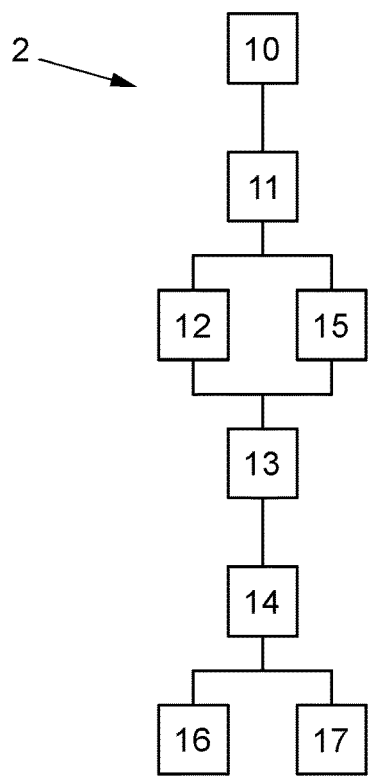
FIG. 5 illustrates still another method according to the invention.

A next embodiment of the method 2 shown in FIG. 5 supplements the embodiments shown in FIGS. 3 and 4. First, as already shown, the system 5 is captured 10 and displayed 11 on the display unit 7. Alternatively, or complementing each other, a captured measuring device 3 is assigned 12 and/or the user places 15 a virtual measuring device 3 in the visualization of the system 5. Subsequently, the installation position of the captured measuring device 3 and/or of the virtual measuring device 3 is evaluated 13 and the evaluation is displayed 14. According to the illustrated embodiment, an optimal installation position 9 with regard to the criteria to be complied with is furthermore displayed 16. Alternatively, or additionally, the computing unit 6 suggests another measuring device 3, wherein the alternative measuring device 3 is displayed 17 in the visualization.

Figure 6:
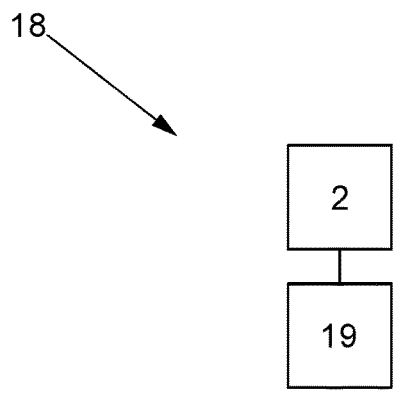
FIG. 6 illustrates yet another method according to the invention for installing a measuring device in a system.

FIG. 6 shows an embodiment of a method 18 for installing a measuring device 3 in a system 5. Initially, in a first step, a method 2 for evaluating the installation position of the measuring device is carried out, wherein the optimal installation position of the measuring device 3 is also determined. Then, in a next step 19, the measuring device 3 is installed at the optimal installation position in the system 5. This embodiment has the advantage that the measuring device can be installed under optimal conditions, which significantly improves the functioning of the measuring device.

The invention claimed is:

1. A method for evaluating the installation position of a measuring device in a system using an augmented reality device, wherein the augmented reality device has a capturing unit for capturing the system, a computing unit and a display unit, the method comprising the following steps:
    at least partially capturing the system using the capturing unit;
    visually representing the system on the display unit on the basis of the at least partial capturing of the system;
    assigning a measuring device installed in the system in an installation position and/or placing a virtual measuring device in an installation position in the visual representation of the system;
    evaluating the installation position of the measuring device and/or the virtual measuring device using the computing unit; and
    representing the evaluation on the display unit;
    wherein the measuring device and/or the virtual measuring device is a level measuring device or a flowmeter;
    wherein installation criteria are used to evaluate the installation position of the measuring device and/or the virtual measuring device;
    wherein the installation criteria takes into account at least one of the relative position of the measuring device to a further component of the system, the flow direction of a medium, the type of the measuring device, and the installation environment of the measuring device;
    wherein the evaluation of the installation position is carried out on a scale; and
    wherein the representation of the evaluation is indicated by a color coding and/or by a numerical value and/or by a further scalable parameter.

2. The method according to claim 1, wherein the augmented reality device includes an AR headset, smart glasses, a smart phone or a tablet.

3. The method according to claim 1, wherein the capturing unit forwards image data and/or video data and/or thermal image data and/or stereo data and/or depth camera data to the computing unit and/or to the display unit.

4. The method according to claim 1, wherein the computing unit recognizes the type and/or the size and/or the length and/or the orientation of individual components of the system based on the data transmitted by the capturing unit.

5. The method according to claim 1, wherein the evaluation comprises an overall evaluation;
    wherein the overall evaluation results from the combination of several individual evaluations; and
    wherein each individual evaluation relates to the evaluation of an individual installation criterion.

6. The method according to claim 1, wherein the computing unit alternatively or additionally determines an optimal installation position of the measuring device in the system, taking into account the installation criteria, and displaying the optimal installation position in the visualization of the system.

7. The method according to claim 6, wherein, in order to determine the optimal installation position, the evaluation of a plurality of installation positions is compared, and the installation position with the best evaluation is output via the display unit as the optimal installation position.

8. The method according to claim 1, wherein component of the system is changed by the user and/or by the computing unit with regard to its type and/or its position and/or its dimensions and/or its orientation in the visualization of the system; and/or
 wherein a component of the visualization of the system is virtually added and/or removed from the system, so that as a result the system is virtually changed at least partially and the installation position of the measuring device in the changed system is evaluated and/or that the optimal installation position of the measuring device in the changed system is determined.

9. The method according to claim 1, wherein the augmented reality device has a memory unit;
 wherein data from a plurality of measuring devices and/or from a plurality of further components of the system is stored in the memory unit; and
 wherein the computing unit determines the type of measuring device and/or the type and/or the dimensions of at least one further component on the basis of the stored data.

10. The method according to claim 1, wherein the measuring device is replaced by an alternative measuring device by the user and/or by the computing unit in the visualization of the system, and the installation position of the alternative measuring device in the system is evaluated and/or the optimal installation position of the alternative measuring device in the system is determined.

11. The method according to claim 1, further comprising installing the measuring device in the system according to the optimal installation position.

12. An augmented reality device, comprising:
 a capturing unit for at least partially capturing a system;
 a computing unit; and
 a display unit;
 wherein the augmented reality device is designed such that, in order to evaluate the installation position of a measuring device in a system, it carries out a method including the following steps:
 at least partially capturing the system using the capturing unit;
 visually representing the system on the display unit on the basis of the at least partial capturing of the system;
 assigning a measuring device installed in the system in an installation position and/or placing a virtual measuring device in an installation position in the visual representation of the system;
 evaluating the installation position of the measuring device and/or the virtual measuring device using the computing unit; and
 representing the evaluation on the display unit;
 wherein the measuring device and/or the virtual measuring device is a level measuring device or a flowmeter,
 wherein installation criteria are used to evaluate the installation position of the measuring device and/or the virtual measuring device;
 wherein the installation criteria takes into account at least one of the relative position of the measuring device to a further component of the system, the flow direction of a medium, the type of the measuring device, and the installation environment of the measuring device;
 wherein the evaluation of the installation position is carried out on a scale; and
 wherein the representation of the evaluation is indicated by a color coding and/or by a numerical value and/or by a further scalable parameter.

* * * * *